United States Patent [19]

Flagg

[11] Patent Number: 4,987,592
[45] Date of Patent: Jan. 22, 1991

[54] MICROPHONE BOOM ASSEMBLY FOR COMMUNICATION HEADSET

[75] Inventor: John E. Flagg, Worcester, Mass.

[73] Assignee: David Clark Company Incorporated, Worcester, Mass.

[21] Appl. No.: 357,771

[22] Filed: May 30, 1989

[51] Int. Cl.⁵ .................... H04M 1/05; H04R 1/10
[52] U.S. Cl. .................................. 379/430; 381/183
[58] Field of Search ............... 379/430; 381/183, 187

[56] References Cited

U.S. PATENT DOCUMENTS

| | | | |
|---|---|---|---|
| 2,862,071 | 11/1958 | Bonnaffous | 381/187 |
| 2,993,962 | 7/1961 | Hothem | 379/430 |
| 3,128,352 | 4/1964 | Cagen | 379/430 |
| 3,190,974 | 6/1965 | Vasicek | 379/430 |
| 3,347,229 | 10/1967 | Heitman | 379/430 |
| 4,152,553 | 5/1979 | White | 379/430 |
| 4,620,068 | 10/1986 | Wieder | 379/430 |
| 4,720,857 | 1/1988 | Burris et al. | 381/187 |
| 4,748,671 | 5/1988 | Wiegel | 381/187 |

FOREIGN PATENT DOCUMENTS

| | | | |
|---|---|---|---|
| 1193675 | 11/1959 | France | 381/187 |
| 1139718 | 1/1969 | United Kingdom | 381/183 |

*Primary Examiner*—Jin F. Ng
*Assistant Examiner*—M. Nelson McGeary, III
*Attorney, Agent, or Firm*—Samuels, Gauthier & Stevens

[57] ABSTRACT

A microphone boom assembly for a communication headset has an elongated relatively rigid base section mounted on an ear dome or the like in a manner permitting both rotation about a first axis and longitudinal or translational movement along a second axis transverse to the first axis. A rigid intermediate section is joined to the base section at a hinge joint permitting rotation of the intermediate section about a third axis transverse to the second axis. A bendable and torsionally adjustable outer section leads from the intermediate section to a socket containing a microphone.

2 Claims, 2 Drawing Sheets

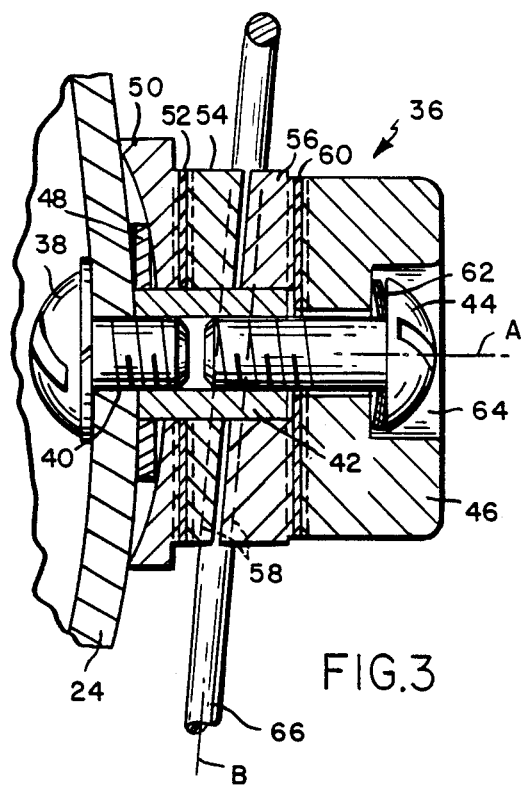
FIG.3
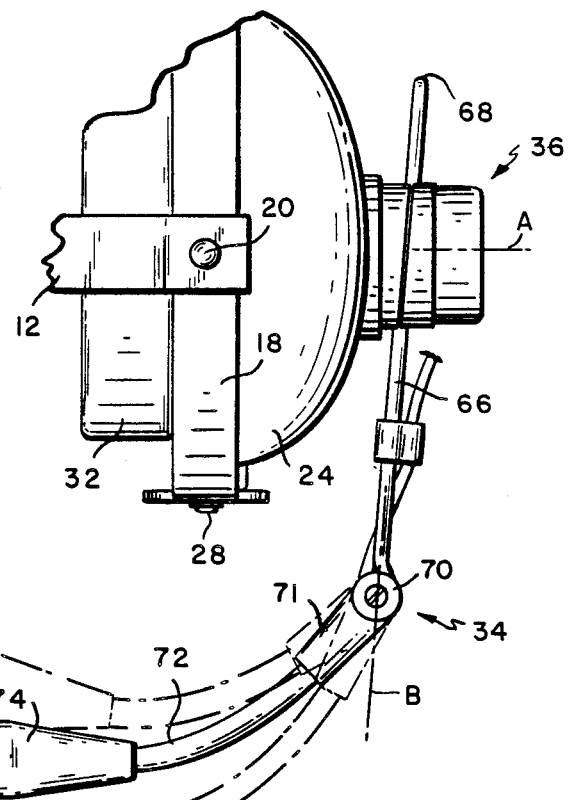
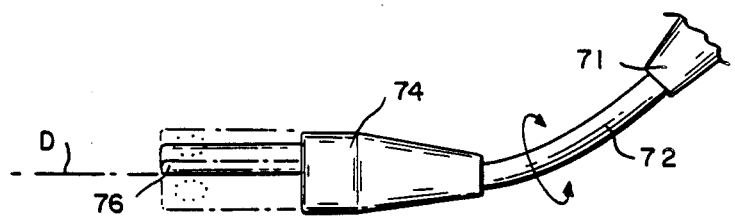
FIG.4
FIG.5

MICROPHONE BOOM ASSEMBLY FOR COMMUNICATION HEADSET

BACKGROUND OF THE INVENTION

1. Field of the Invention

This invention relates generally to communication headsets, and is concerned in particular with an improvement in the boom assemblies used to adjustably position the microphones of such headsets.

2. Description of the Prior Art

The conventional communication headset generally includes a pair of earphones which are typically contained in housings or "domes" designed to enclose the user's ears. The domes are articulately supported in stirrups which are interconnected by an adjustable headband designed to fit comfortably over the user's head. A microphone is carried at the distal end of an adjustable boom assembly which extends in cantilever fashion from one of the domes. The microphone is operatively positioned in relation to the user's mouth by manual adjustment of the boom assembly.

The boom assemblies which have been developed in the past offer limited ranges of microphone adjustability. For example, some known boom assemblies comprise several articulately interconnected rigid arm segments which can be pivoted one with respect to the other, with the base segment being mounted on one of the ear domes for both rotational and translational adjustment. Such arm segments are not, however, bendably or torsionally adjustable, with the result that the microphone may not always be set at the proper angle in relation to the user's mouth for optimum performance.

Other known boom assemblies comprise bendably and torsionally adjustable tubular arms which are rotatably mounted on one of the ear domes. In addition to again offering only limited ranges of adjustment due to the inability to accommodate translational shifting of the boom assembly in relation to the supporting ear dome, such boom assemblies also suffer from the problem that the arm invariably undergoes some bending each time the user wishes to temporarily move the microphone away from his or her mouth, for example when sneezing, drinking a cup of coffee, etc. In order to return the microphone to its previously set position, the user must carefully restore the shape previously imparted to the arm. Failure to do so will adversely affect microphone performance.

SUMMARY OF THE INVENTION

The objectives of the present invention include the provision of a boom assembly which allows maximum adjustment for optimum microphone positioning, which permits such adjustments to be made with minimal effort on the part of the user, and which allows the user to thereafter move the microphone between use and non use positions without having to readjust the shape of component parts of the assembly.

BRIEF DESCRIPTION OF THE DRAWINGS

FIG. 3 is a sectional view on an enlarged scale taken along line 3—3 of FIG. 2;

FIG. 4 is a partial plan view of the boom assembly and associated ear dome, schematically depicting additional adjustments; and FIG. 5 is a partial view of the outer end portion of the boom assembly schematically depicting torsional adjustment of the microphone position.

DETAILED DESCRIPTION OF PREFERRED EMBODIMENT

Figure 1:
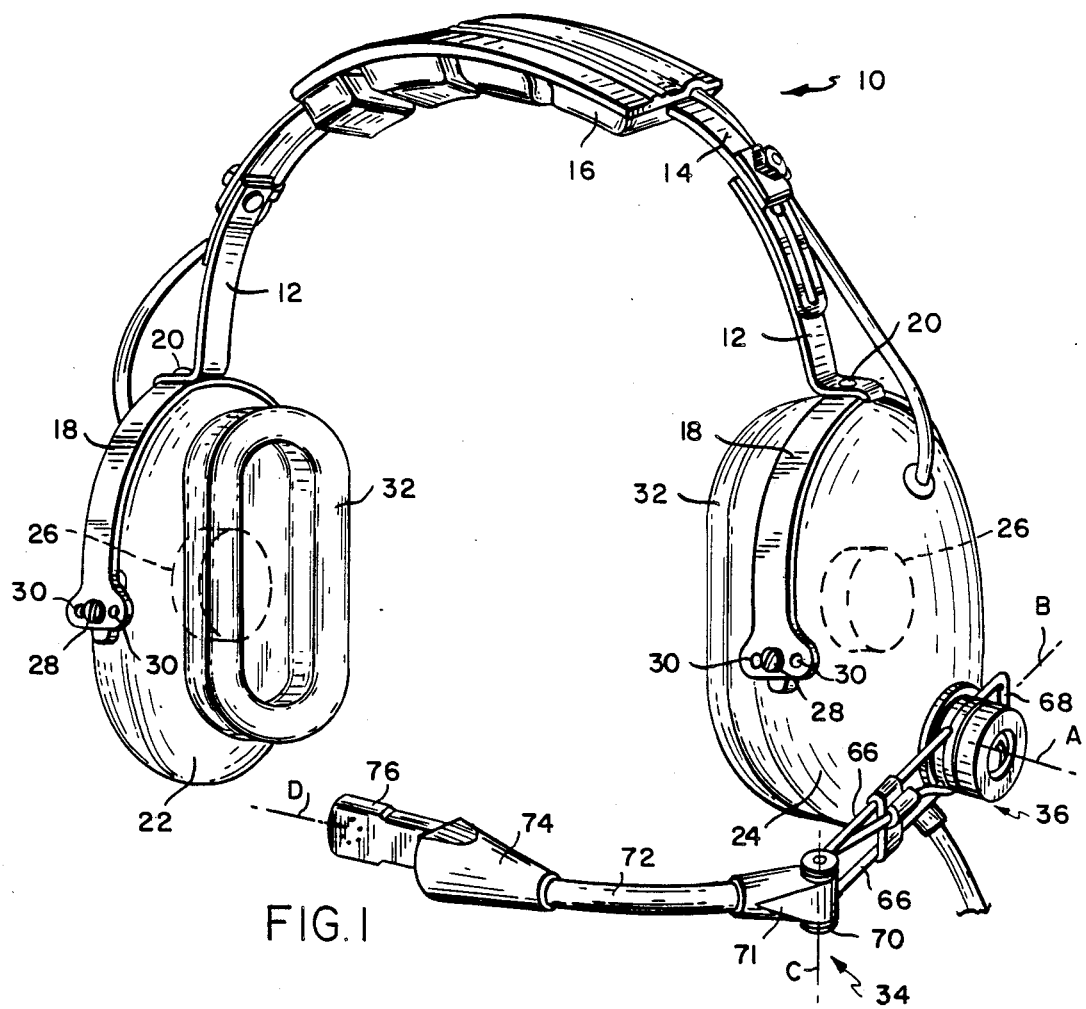
FIG. 1 is a perspective view of a communication headset incorporating a boom assembly in accordance with the present invention.

Referring now to the drawings, a communication headset of the noise attenuating type is shown comprising a headband 10 having a pair of stirrup clamps 12 adjustably connected to a headband spring 14, the latter being partially encased within a cushioned headpad 16. Stirrups 18 are connected to the clamps 12 for limited rotational adjustment about the generally vertical axes of rivets 20 or other like connectors. Noise attenuating domes 22, 24 containing earphones schematically depicted at 26 (FIG. 1) are supported by the stirrups 18 for limited rotation about the axes of connectors 28, the latter being receivable in one of several holes 30 to thereby provide a means of adjusting the pressure at which the domes are applied to the user's ears. Liquid filled ear seals 32 are provided on the interior confronting surfaces of the domes to enhance noise attenuation and comfort.

A boom assembly generally indicated at 34 is adjustably supported on one of the ear domes 24 by means of a boom mount generally indicated at 36. As can be best seen in FIG. 3, the boom mount 36 includes an inner machine screw 38 which extends through a hole 40 in the ear dome 24 and which is received in threaded engagement in an inner tubular collar 42. An outer screw 44 extends through an outer collar 46 and is also received in threaded engagement in inner collar 42 in axial alignment with screw 38. Looking from left to right in FIG. 3, the following components are received on the inner collar 42 between the outer surface of the ear dome 24 and the inner surface of the outer collar 46: a gasket 48; a cupped washer 50; a serrated washer 52; a pair of washers 54, 56, each having confronting slanted grooves 58; and, another serrated washer 60. Serrated washer 52 coacts with serrations, buttons or like detent mechanisms on the confronting surfaces of washers 50 and 54. Serrated washer 60 coacts similarly with detent mechanisms on the confronting surfaces of washer 56 and collar 46. Spring tension washers 62 are positioned under the head of the screw 44, the head being received in a countersunk recess 64 in collar 46.

The boom assembly 34 is provided with a substantially rigid base section which includes a pair of parallel wires 66 joined at one end as at 68. The wires 66 pass through the boom mount 36 between the confronting slanted grooves 58 of the washers 54, 56. The wires 66 are connected at their opposite ends by means of a hinge joint 70 to a rigid intermediate section 71. A bendably and torsionally adjustable outer section 72 leads from the intermediate section 71 to a socket 74 containing a microphone 76.

Figure 2:
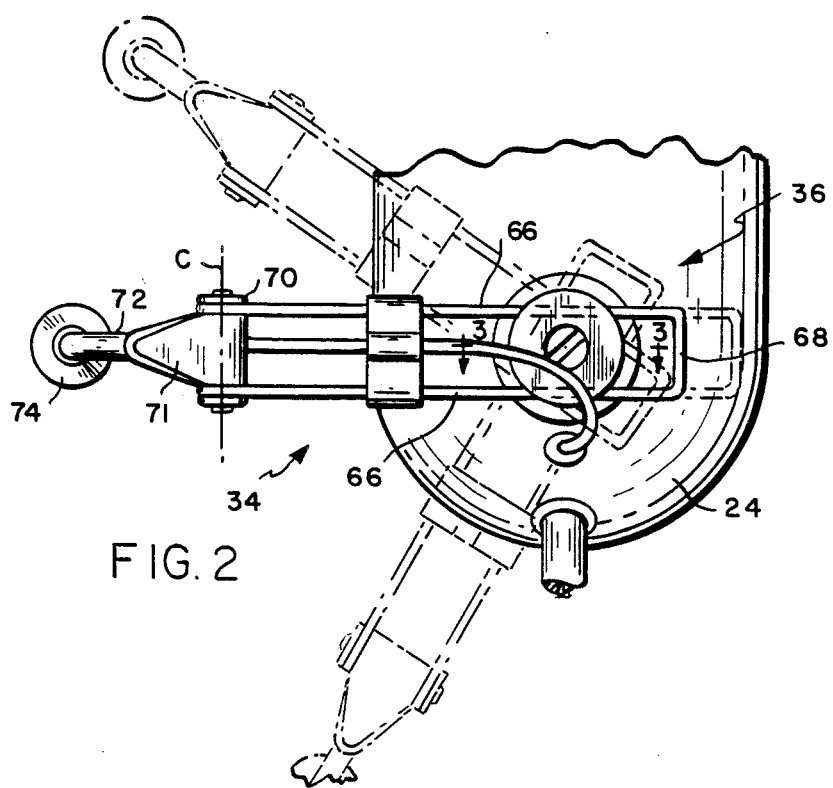
FIG. 2 is a partial side elevational view of the boom assembly and associated ear dome, schematically depicting several possible boom assembly adjustments.

The boom mount 36 enables the entire boom assembly 34 to be rotated about a first axis "A". Furthermore, the frictional grip of the slanted groove washers 54, 56 on the wires 66 permits the entire boom assembly to be shifted in opposite directions along a second axis "B" extending transversely with respect to axis A. Typical rotational and translational adjustments of the boom assembly are depicted schematically by the broken lines in FIG. 2.

The hinge joint 70 interconnecting the base and intermediate sections of the boom assembly permits rotational adjustment of the intermediate and outer sections about a third axis "C" which extends transversely with respect to axis B. Examples of such rotatable adjustments are depicted schematically by the broken lines in FIG. 4.

The tubular outer section 72 is both bendably and torsionally adjustable in relation to the intermediate section 71. As schematically depicted in FIG. 5, torsional adjustment occurs about a fourth axis "D", whereas bendable adjustment can occur in any direction, i.e., throughout a 360° range.

In light of the foregoing, it will now be appreciated by those skilled in the art that the boom assembly 34 of the present invention affords infinite adjustability for precise microphone placement, thereby insuring optimum performance. More particularly, rotational adjustment about axis A coupled with translational adjustment along axis B and rotational adjustment about axis C will achieve an approximate location of the microphone with respect to the user's mouth. The gripping action of the slanted grooved washers 54, 56 on the wires 66 will maintain the base section at any selected position of adjustment along axis B. By the same token, the serrated washers 52, 60 will coact with detent mechanisms on adjacent components to yieldably resist rotation about axis A and thereby yieldably retain the boom assembly in a selected position of rotative adjustment. The final precise positioning of the microphone will be achieved by bendably and torsionally adjusting the flexible outer boom section 72 in relation to the rigid intermediate section 71.

Once all this has been achieved, the user can quickly shift the microphone away from his or her mouth to an inoperative position by simply grasping the rigid intermediate boom section 71 with the fingers of one hand and rotating it outwardly about axis C as schematically depicted in FIG. 4. This can be done without disturbing the position of the base section of the boom assembly, and without changing the shape of the flexible outer section 72. The microphone can just as easily be returned to its operative position by again grasping the intermediate section 71 with the fingers of one hand and swinging it inwardly about axis C, again without disturbing either the position of the base section or the shape of the outer section.

Although the present invention has been illustrated and described in connection with noise attenuating headsets, it will be understood that it has equal applicability to all types of headsets, communication headgear, etc.

I claim:

1. In a communication headset having a pair of housings containing earphones, a microphone, and a boom assembly extending from one of said housings for adjustable supporting said microphone, said boom assembly comprising:

an elongated substantially rigid base section;

first means for connecting said base section to the said one of said housings in a manner permitting both rotation of said base section about a first axis and longitudinal translation of said base section in opposite directions along a second axis extending transversely with respect to said first axis;

an elongated flexible outer section having inner and outer ends;

a rigid intermediate section having inner and outer ends, the outer end of said intermediate section being joined to the inner end of said outer section, and the inner end of said intermediate section being connected to said base section for rotation about a third axis spaced from said first axis and extending transversely with respect to said second axis; and means at the outer end of said outer section for receiving said microphone, said outer section being both bendably and torsionally adjustable to achieve a selected position and angular orientation of said microphone with respect to said intermediate section, and said intermediate section being rotatable about said third axis without disturbing the thus achieved selected position and angular orientation.

2. In a communication headset having a pair of housings containing earphones, a microphone, and a boom assembly extending from one of said housings for adjustably supporting said microphone, said boom assembly comprising:

an elongated substantially rigid base section;

first means for connecting said base section to the said one of said housings in a manner permitting both rotation of said base section about a first axis and longitudinal translation of said base section in opposite directions along a second axis extending transversely with respect to said first axis;

a rigid intermediate section;

second means for connecting said intermediate section to said base section for rotation about a third axis spaced from said first axis and extending transversely with respect to said second axis;

an elongated flexible outer section having an inner end connected to said intermediate section at a location spaced from said third axis, and having an outer end remote from said intermediate section; and means at the outer end of said outer section for receiving said microphone, said outer section being both bendably and torsionally adjustable to achieve a selected position and angular orientation of said microphone with respect to said intermediate section, and said intermediate section being rotatable about said third axis without disturbing the thus achieved selected position and angular orientation.

* * * * *